July 19, 1932. C. T. WEYMANN 1,868,263
VEHICLE BODY
Filed Dec. 20, 1927 6 Sheets-Sheet 1

July 19, 1932.  C. T. WEYMANN  1,868,263
VEHICLE BODY
Filed Dec. 20, 1927  6 Sheets-Sheet 2

July 19, 1932. C. T. WEYMANN 1,868,263
VEHICLE BODY
Filed Dec. 20, 1927 6 Sheets-Sheet 6

Fig. 15.

Witness
Martin H. Olsen.

Inventor
Charles Torres Weymann
By Rector, Hibben, Davis and Macauley
Attys.

Patented July 19, 1932

1,868,263

UNITED STATES PATENT OFFICE

CHARLES TERRES WEYMANN, OF PARIS, FRANCE, ASSIGNOR, BY MESNE ASSIGNMENTS, TO WEYMANN MOTOR BODIES, INC., OF WILMINGTON, DELAWARE, A CORPORATION OF DELAWARE

VEHICLE BODY

Application filed December 20, 1927. Serial No. 241,416.

My invention relates generally to vehicle bodies and more particularly to bodies of the Weymann type, which are adapted to weave, warp or flex in harmony or synchronism with the chassis frame without danger of permanent distortion. In general, the Weymann type of body comprises a flexible skeleton frame covered with leather, fabric or the like, as exemplified in my U. S. Letters Patent, No. 1,519,093 granted December 9, 1924.

One of the main objects of my invention is to provide a novel rear end construction for vehicle bodies of the Weymann type.

A further object of my invention is to mount a cross member or panel, carrying an instrument or instruments, on a flexible frame unit of the body in such a way that the panel does not interfere with or resist the weaving or warping action of the flexible frame unit. For example, the panel, supporting the window-lift operating device and door handle, is pivotally mounted on metal plates secured to the side members of the flexible frame of the door which flexes or weaves with the body as a whole.

Another object of my invention is to provide a flexible partition to divide the body into compartments, such as a chauffeur compartment and a tonneau compartment, and so secure the partition in place that it will not interfere with the weaving or warping action of the body.

Still another object of my invention is to provide means for causing the doors to weave or flex laterally in unison with the main skeleton frame of the body, under all conditions, to avoid excessive lateral movement of the free corners of the doors relative to the main body frame, and thus eliminate noise and wear which might otherwise occur.

An additional object of my invention is to provide novel forms of flexible brackets of the Weymann type for connecting together parts of the skeleton frame of the body.

With the above and incidental objects in view, the invention consists in certain novel features of construction and combination of parts, the essential elements of which are recited in the appended claims and preferred and modified forms of embodiment of which are described in detail hereinafter and illustrated in full in the accompanying drawings, which form part of this specification.

Referring to Figs. 1 to 4, inclusive, it will be seen that the skeleton frame of the body generally comprises vertical transverse frame units (the front, intermediate and rear units being designated generally by the reference numerals 16, 17 and 18, respectively), connected together by top longitudinal spacing pieces 19 and bottom longitudinal spacing pieces 20, and a rear end or tonneau structure consisting of a plurality of horizontal frame units and members and vertical connecting pieces as will be described in detail later. Each of the transverse vertical frame units 16, 17 and 18 comprises a bottom cross bar 25, vertical posts 26 and a top cross bow 27, the parts being connected together by the well known Weymann form of flexible joints 28, which comprise thin pieces or strips of metal bolted, screwed or riveted to the pieces, which are kept in slightly spaced condition at their points of connection so that they do not contact. As shown in Figs. 2, 3, 4, and 4A, the wooden pieces forming the frame units are recessed or grooved so that the outer sides of the strips of metal 28 are flush with the sides of the pieces. To carefully finish the bottoms of the grooves would require considerable labor and entail quite an expense. To make this unnecessary I place a strip of paper 28$^a$ (Fig. 4A) under each strip of metal and thus provide a smooth surface against which the metal strip properly bears.

Figures 1, 1A:
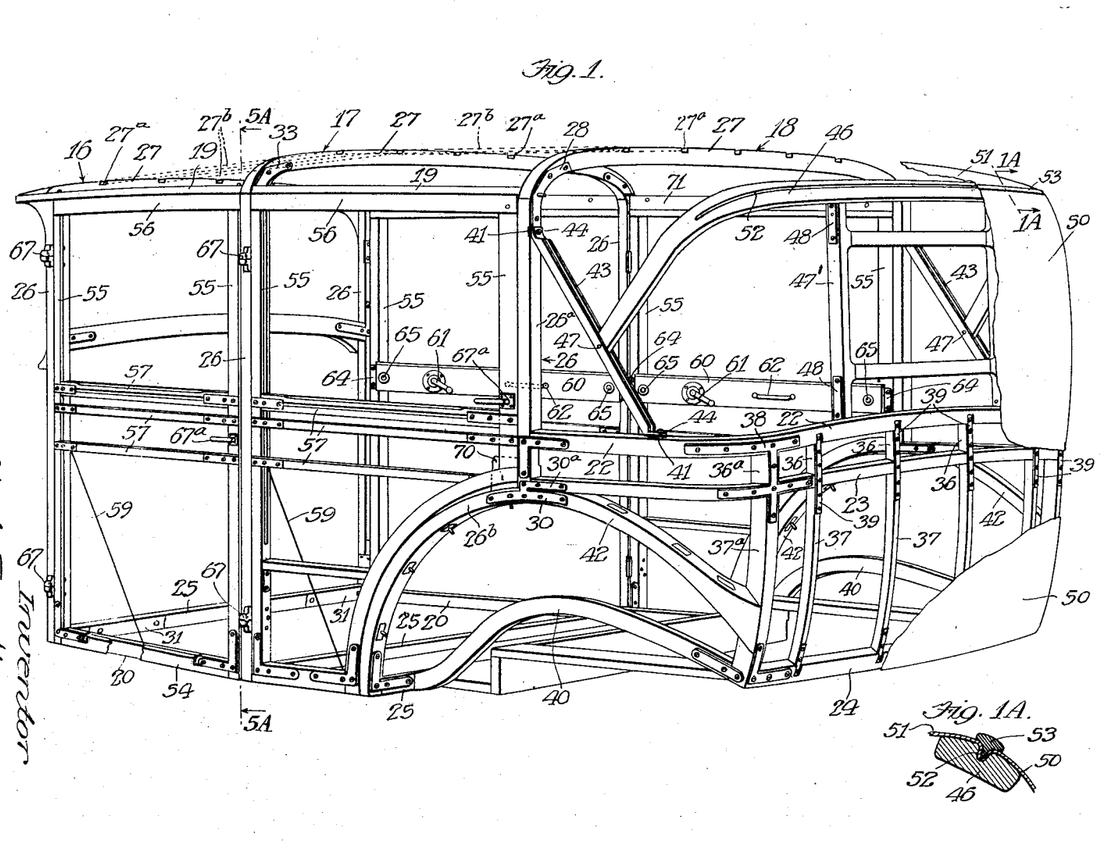
Fig. 1 is a perspective view of a body skeleton, illustrating one form of embodiment of my invention.
Fig. 1A is an enlarged fragmentary section through the rear top bow, as on the line 1A—1A of Fig. 1.
Figure 2:
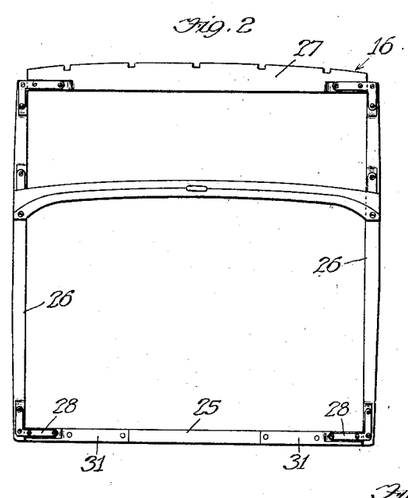
Figs. 2, 3, and 4 are front elevations of the front, intermediate and rear vertical transverse frame units, respectively, of the body shown in Fig. 1.
Figure 3:
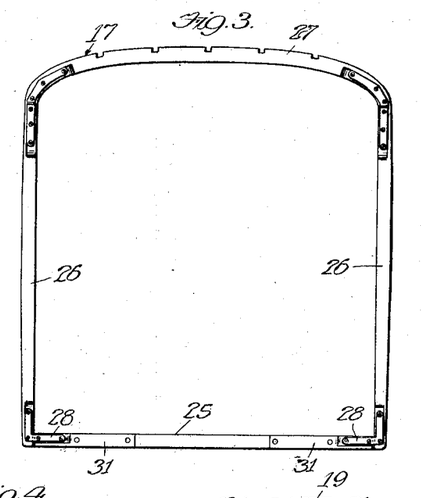
Figures 4, 4A, 5, 5A:
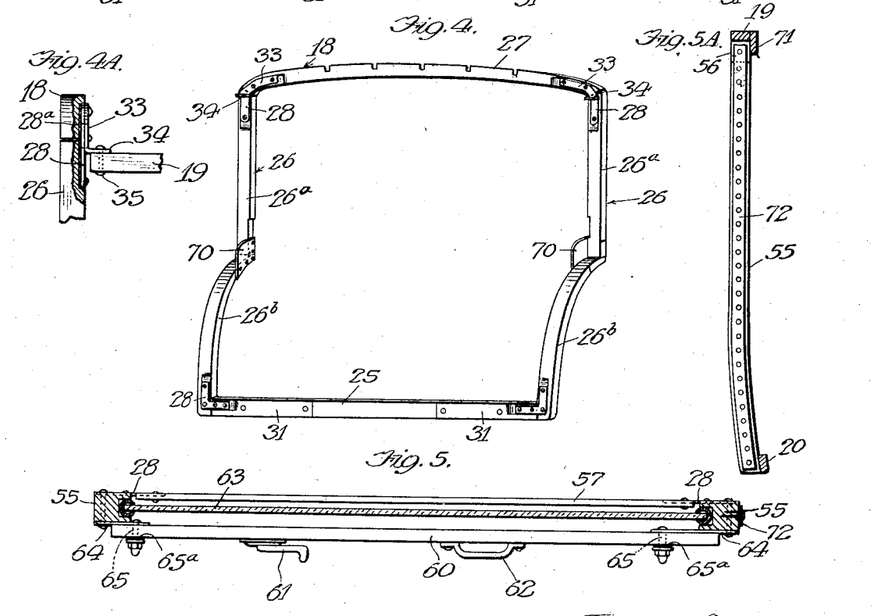
Fig. 4A is a fragmentary side view illustrating the form of bracket for connecting the vertical transverse frame units to the upper spacing pieces.
Fig. 5 is an enlarged horizontal section through one of the door frames, as on the line 5—5 of Fig. 6.
Fig. 5A is a rear end elevation of one of the doors, taken as on the line 5A—5A of Fig. 1.

Referring to Figs. 1 and 4, it will be observed that the posts of the rear frame unit 18 comprise two pieces 26$^a$ and 26$^b$, the lower part 26$^b$ being curved to conform to the curvature of the rear fender (not shown) while the upper part 26$^a$ is vertical, the two parts being connected together by an improved form of bracket 30 (Figs. 1 and 12) which will be described more fully hereinafter.

Figure 9:
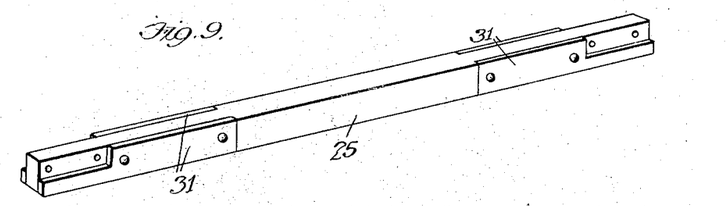
Fig. 9 is a perspective view of the reinforced bottom cross piece of one of the transverse vertical frame units.

As is well understood, the bottom bars or pieces 25 of the frame units 16, 17 and 18 are adapted to be secured to the side sills of the chassis frame of the automobile. Inasmuch as these bars 25 extend laterally a considerable distance beyond the side sills and are formed of comparatively thin wood, their ends are apt to sag and in order to prevent this action, thin metal plates 31 are fastened by bolts or otherwise to the opposite sides of the cross bars 25, as shown in Fig. 9.

The ends of the bottom longitudinal pieces 20, which space the lower ends of the transverse frame units 16, 17 and 18 apart, are connected to the lower ends of the frame units by the usual Weymann joints. The top longitudinal spacing pieces 19 are flexibly connected at their ends to the transverse vertical frame units 16, 17 and 18 by means of brackets 33, best shown in Figs. 3, 4 and 4A. The brackets 33 are super-imposed on the upper parts of the brackets 28 (connecting the posts 26 and top bows 27 together) and are secured to the top bows by the bolts, screws or rivets projecting through the holes in the upper part to the brackets 28. The brackets 33 have laterally extending projections 34 to which the pieces 19 are secured by means of rivets or bolts 35, as illustrated in Fig. 4A.

Figures 10, 11, 12, 13:
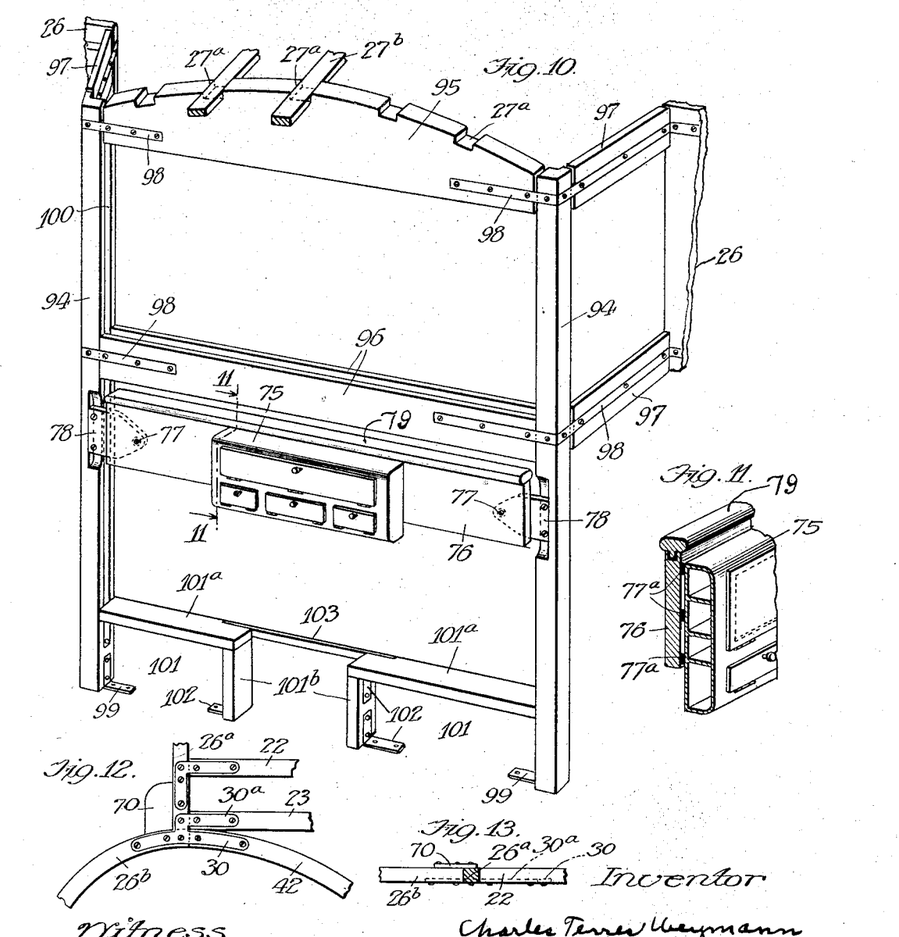
Fig. 10 is a perspective view of a partition for dividing a body into compartments.
Fig. 11 is a vertical perspective section taken through a cabinet on the partition, as on the line 11—11 of Fig. 10.
Fig. 12 is a fragmentary side view illustrating the brackets for connecting parts of the rear end structure to the rear transverse vertical frame unit.
Fig. 13 is a top plan view of the parts shown in Fig. 12, the vertical post being shown in section.

Referring now to Fig. 1, it will be observed that the top horizontal frame unit 22, of the rear body or tonneau structure, is in the form of a bow, having its forward ends attached by Weymann brackets to the vertical posts 18. The bow may be formed of one piece, bent to conform to the desired U-shape, or it may be formed of several pieces connected together by Weymann joints. The horizontal frame unit 23 is similarly formed and shaped and its forward ends are connected to projection 30$^a$ of the bracket 30 (Figs. 1, 12 and 13). For lack of a better term, I use the phrase tonneau structure to mean the part of the rear end enclosing the sides and back of the rear seat.

Interposed between the rear cross bars of the two horizontal frame units 22 and 23 are corner pieces 36$^a$ and a plurality of short pieces 36, which are in vertical superimposed alignment with longer corner posts 37$^a$ and pieces 37. As shown in Fig. 1, the corner pieces 36$^a$ and posts 37$^a$ are connected to the bows 22 and 23 by flexible joints 38 of peculiar construction, the horizontal frame units 22 and 23 shown in this view being formed in three pieces and the bracket 38 being adapted to secure the ends of the pieces together and in spaced relation. It is understood that, as is usual in the Weymann type of body, the various bars and pieces, forming the skeleton frame of the body do not contact with each other at their points of connection, slight gaps being provided between the ends of the pieces. These gaps may be filled with flexible material, such as rubber or felt. The thinner pieces 36 and 37 are connected to the bows 22 and 23 by plain straight strips of metal 39. The bottom transverse bar 24 is in like manner connected to the lower ends of the pieces 37 and it is connected at its ends by L-shaped brackets to the posts 37$^a$. The lower ends of the posts 37$^a$ are also connected to curved pieces 40 which at their forward ends are secured to the bottom bar 25 of the rear transverse frame 18. Arcuate pieces 42, one on each side, are connected at their forward ends to portions of the brackets 30 and at their rear ends to the posts 37$^a$.

In order to connect the rear end structure to the upper part of the rear transverse vertical frame 18, I provide inclined bars 43, preferably formed of channel iron and having slightly flexible end lips 44 adapted to lie flat against the rear sides of vertical posts 26 and the upper side of the horizontal bow 22. These lips are secured to the posts and the horizontal bow 22 by means of screws or bolts extending through the lips 44. In order to permit proper relative movement between the bars 43 and the posts 26 and the horizontal unit 22 when the body weaves, I preferably interpose pieces of rubber 41 between the lips 44 and the posts and bow.

A rear top bow 46 is provided to give the proper contour to the rear end of the top and the upper portion of the back of the body. The ends of the bow 46 are seated in the channels of the members 43 and are held in position therein by means of bolts or pegs 47 extending through the ends of the bows and the sides of the channel members 43. Mounted between the transverse portions of the bows 22 and 46 is a window frame 47' which is connected to the bows by means of Weymann joints 48.

It will be understood that the rear portion of the body frame is covered with leather, water-proof fabric or the like. Such a covering 50 is shown broken away in Fig. 1. The top bows 27 of the transverse vertical frame 16, 17, and 18 have recesses 27ª in which are mounted spaced longitudinally extending strips 27ᵇ (parts of only two of which are shown in dotted lines in Fig. 1) over which the top fabric 51 is stretched. Only a small portion of the top fabric is shown in Fig. 1. The bow 46 is provided with a groove 52 (Fig. 1A) in which the meeting edges of the fabrics 50 and 51 are secured and covered by a suitable beading 53.

Figure 6:
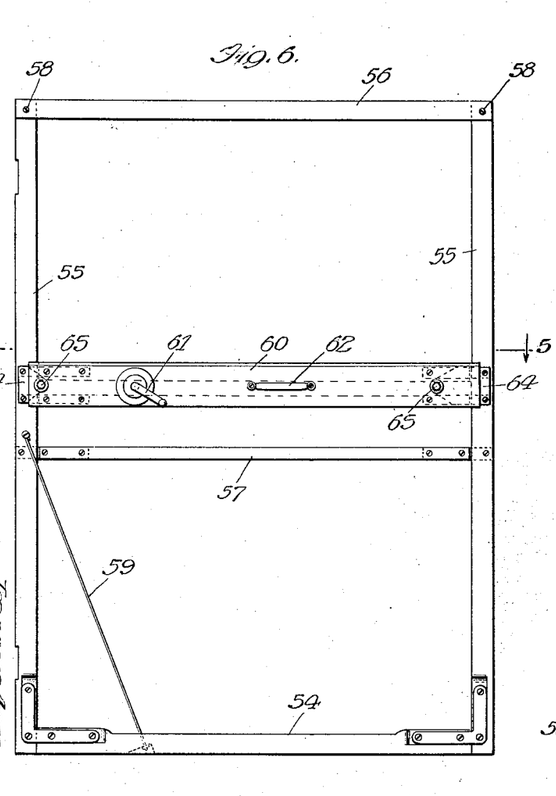
Figs. 6 and 7, respectively, are enlarged inside and outside elevations of the skeleton frame for the right-hand front door.
Figures 7, 8:
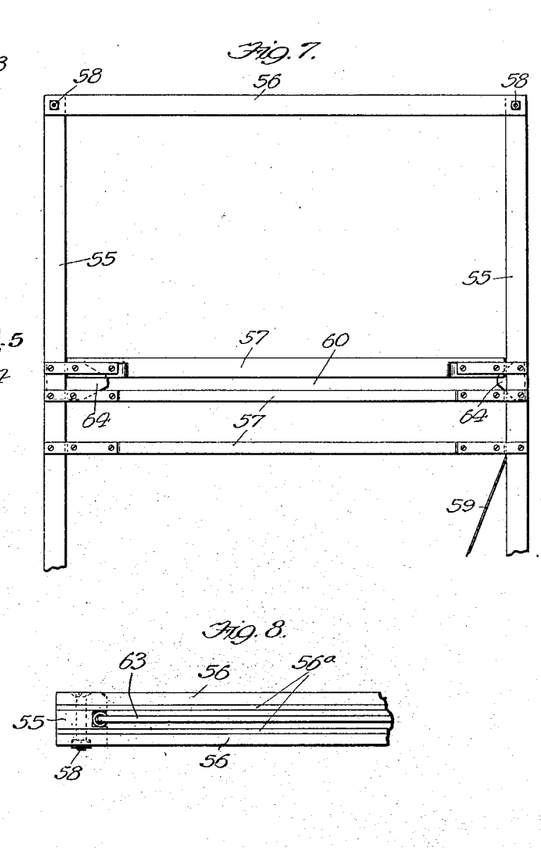
Fig. 8 is an enlarged plan view of part of the skeleton frame of one of the doors.

The front and rear doors are of slightly different size and contour, but their construction is substantially the same so that a description of one of the front doors will suffice for all of them. Referring to Figs. 6, 7, and 8, which illustrate the construction of the right-hand front door, it will be observed that the door frame comprises a rectangular frame having a bottom piece 54, vertical pieces 55 and spaced apart top pieces 56 (Fig. 8). The lower ends of the vertical pieces 55 are connected to the piece 54 by the usual Weymann joints. The two top pieces 56 are spaced apart to permit the upper edge of the window glass 63 to pass between them as shown in Fig. 8, the vertical pieces 55 have grooves in which the vertical edges of the window glass slide. The upper ends of the vertical pieces 55 are reduced in thickness to accommodate the ends of the pieces 56, and because of lightness of the parts I connect them together by means of bolts, screws or rivets 58. I also preferably provide thin metal strips 56ª on the facing sides of the pieces 56 to add strength to the top of the door, without, however, impairing its flexibility. Rubber or other soft material may be used between the ends of the pieces 55 and pieces 56 and 56ª to prevent noise. The vertical pieces 55 at their central portions are connected by Weymann joints to the ends of thin cross pieces 57 (preferably three in number), positioned to the inside of the window glass. An adjustable wire 59 is connected to the forward vertical piece 55 and the bottom piece 54 in order to bring the door frame back into its exact rectilinear shape in the event the door becomes permanently distorted due, for example, to the weight of a person to which it may be improperly subjected. Normally, however, the wire 59 is intended to be somewhat slack.

Supported on the door frame is a cross panel or member 60 (Figs. 5 and 6) which is preferably quite rigid in itself in order to carry an inside door handle 62 and an operating device 61 for the window lift mechanism. In order to mount this panel on the door, so that it will not interfere with the desirable weaving or warping action of the door, I provide two metal plates 64 which are countersunk into the vertical pieces 55 and have triangular shaped extending ends provided with pivot bolts 65 which extend through holes in the panel 60 so that the latter is pivotally mounted on the door and out of contact with the wooden pieces of the door frame. Flexible washers 65ª (Fig. 5) preferably formed of rubber are interposed between the panel and the nuts on the bolts 65 which have a loose fit in the holes in the panel. It will be understood that the upper edge of the interior lining or cover (not shown) of the door may be connected to the panel 60.

As is usual in Weymann bodies, the door is mounted at one side of two hinges 67 (Fig. 1) and the other side of the door is provided with a lock 67ª, such as that shown in my U. S. Patent No. 1,561,129, granted November 10, 1925, for permitting a pivotal movement. It will thus be seen that the door, when closed, is supported at three points and that in some cases when the body weaves one of the free corners of the door may have more or less lateral movement relative to the adjacent vertical post 26 which would result in a slapping noise and wear and tear on the parts as well as permanent distortion. Take, for example, the rear left hand door shown in Fig. 1, it will be seen that when the rear transverse vertical frame unit 18 flexes towards the right and relative to the intermediate frame unit 17, the upper end of the post 26ª would, unless otherwise prevented, draw away from the upper free corner of the door, and then when the frame 18 resumed its normal condition the upper free end of the door would close causing a noise and wear. To prevent this action, I provide projections on the posts 26 for engaging the inner sides of the rear edges of the doors. In Figs. 1, 4, 12 and 13 I show such projections for each rear door as being in the form of a metal plate 70 which also serves as a joint between the pieces 26ª and 26ᵇ. The inner side of the top of the door engages a strip 71 (Figs. 1 and 5A) secured to the adjacent piece 19. With this construction, it will be evident that when the transverse frame 18 weaves, the rear doors are caused to flex in unison with it. Plates similar to the plates 70 may be used in connection with the front doors for the same purpose.

It is, of course, highly desirable that the outer sides of free edge portions of the doors be flush with the outer sides of the adjacent posts of the body to avoid gaps at the corners of the door and to insure engagement of the inner sides of the doors with the strips 71, plates 70 and the bottom spacing members 20. The body frame and doors are formed of thin pieces of wood which are apt to warp after being cut and which may not be accurately joined together in assembly, either of which may result in free edges of the doors being out of exact alignment with the adjacent body posts. In order to correct any such defect which may exist when the frame and doors have been assembled, and also to prevent the doors from becoming sprung or warped out of shape in usage, I attach to the rear edge of each door a thin strip of annealed steel 72 (Figs. 5 and 5A). The strips are provided with nail holes before they are annealed. If one of the corners of a door is sprung either inwardly or outwardly so that the door is not in proper alignment, the rear piece 55 of the door is bent to bring it to proper alignment and while in such bent position the annealed strip is nailed to the rear edge, thereby retaining the rear portion of the door in its snugly closing position. The strips are initially formed so that their contour is the same as that intended for the rear edge of the door but in case the rear piece 55 of a door has to be bent in order to get the proper fit, the strip 72, if attached to the rear edge of the door without treatment might extend laterally beyond the door and it would also interfere with the tacking space beside it for the finishing cover for the door. The strip before it is attached is then given the desired contour by peening the strips along one edge so that it will curve in the desired direction in the plane of the strip. For example, if the lower portion of strip shown in Fig. 5A is to be curved towards the right, the left hand edge portion of the lower part of the strip is repeatedly struck by a peening hammer until the required curvature is attained.

Fig. 10 illustrates one form of partition adapted to divide the body into compartments, such as the front seat or chauffeur compartment and the passenger or tonneau compartment, thus insuring privacy for the occupants of the rear seat. If desired, this form of compartment can be used in a body of the general type shown in Fig. 1. In Fig. 10, I have shown only the upper parts of the vertical posts 26 for the intermediate transverse vertical frame 17 of the body skeleton. The frame of the partition may comprise vertical posts 94, a top bow 95, two intermediate spaced pieces 96 between the posts 94, and spacing pieces 97 between the posts 26 and the posts 94. The parts on each side are connected together by the thin strips of metal 98. The lower ends of the posts 94 are connected to the floor or to a cross bar of the body frame by means of the Weymann joints 99.

The facing edges of the posts 94 are provided with channels 100 in which a window (not shown) is adapted to slide, the pieces 96 being spaced apart to accommodate the window. A glass window (not shown) on each side may be provided in the space bounded by the pieces 97 and the posts 94 and 26, if desired. The lower portion of the partition is preferably covered by a flexible covering (not shown).

Compartments 101 may be provided in the bottom of the partition as shown in Fig. 10. The boards 101ª and 101ᵇ forming the top and adjacent sides of the compartments, may be connected together and to the posts 94 and floor by Weymann joints 102 and the two compartments may be connected together by a metal strip 103. Any suitable form of doors (not shown) may be employed for closing the compartments, which are used for the storage of tools or other articles.

It will be understood that with the form of partition shown in Fig. 10, that the back of the front seat will be positioned against the transverse portion of the partition and between its converging or inclined sides. The sides converge to permit more ready ingress and egress through the rear doors. In some types of bodies, the partition may be in the same plane as one of the transverse vertical frames, in which case the pieces 97 are dispensed with.

In Figs. 10 and 11, I have illustrated a suitable cabinet 75 for toilet articles, ash trays or other articles, the cabinet being mounted on a panel 76 supported at its ends on pivot 77 carried by plates 78 which are secured to the posts 94 and are similar to the plates 64 for carrying the door panels 60. Thus, the cabinet is carried on the partition without interfering with the weaving or warping action of the latter. If the partition is not employed in the body, the panel 76 may be secured in a like manner to the vertical posts 26 of one of the transverse vertical frames, for example, the intermediate frame 17 of the body shown in Fig. 1. Strips of fabric 77ª or the like are preferably interposed between the panel 76 and the back of the cabinet to prevent any noise which would result should the parts become loose and rub against each other. The top of the panel is provided with a groove into which a trim strip 79 is fitted and a strip of fabric 81, impregnated with glue, is interposed between these two parts.

Figure 14:
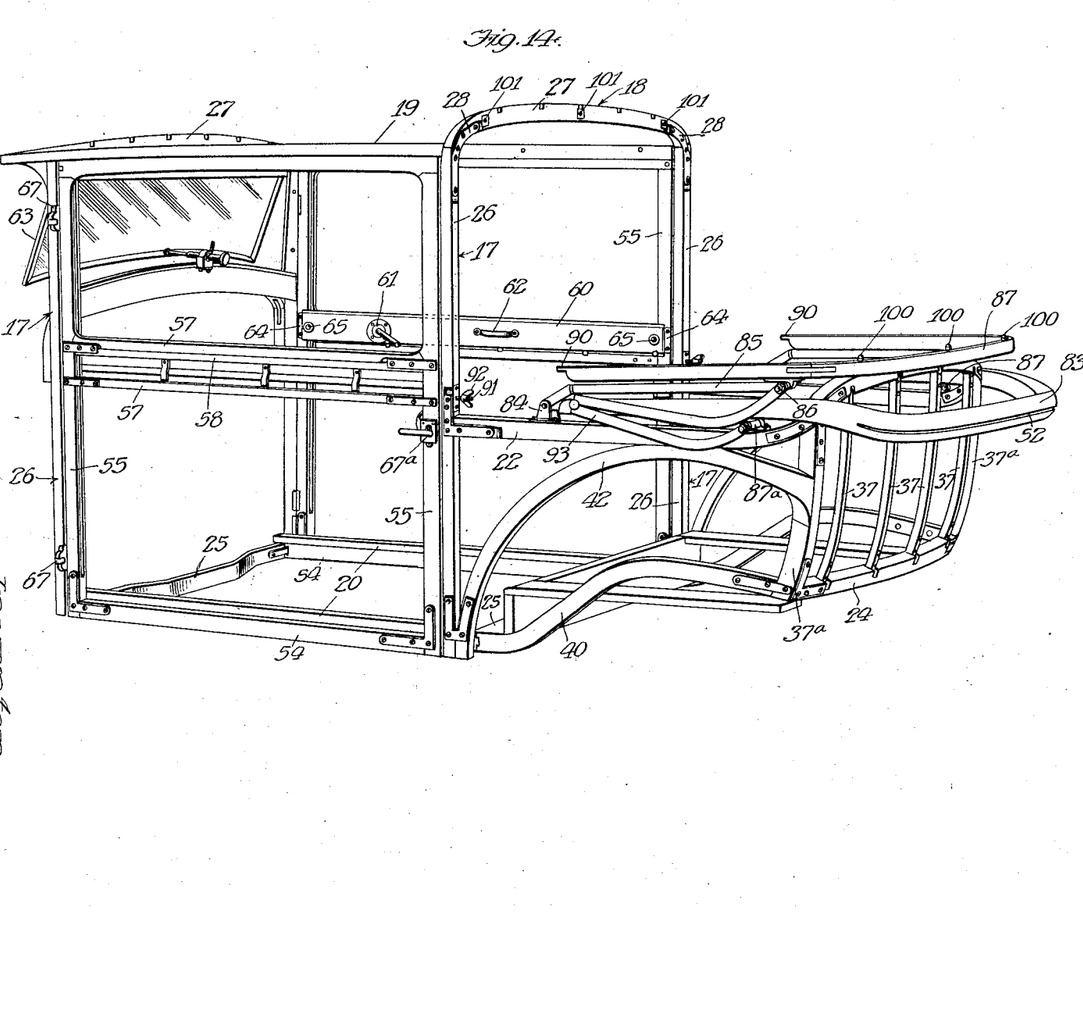
Fig. 14 is a perspective view of a modified form of body skeleton, embodying my invention, and, Fig. 15 is an enlarged perspective view of the rear part of the body of Fig. 14 and shows its rear top part in upright or non-collapsed position.
Figure 15:
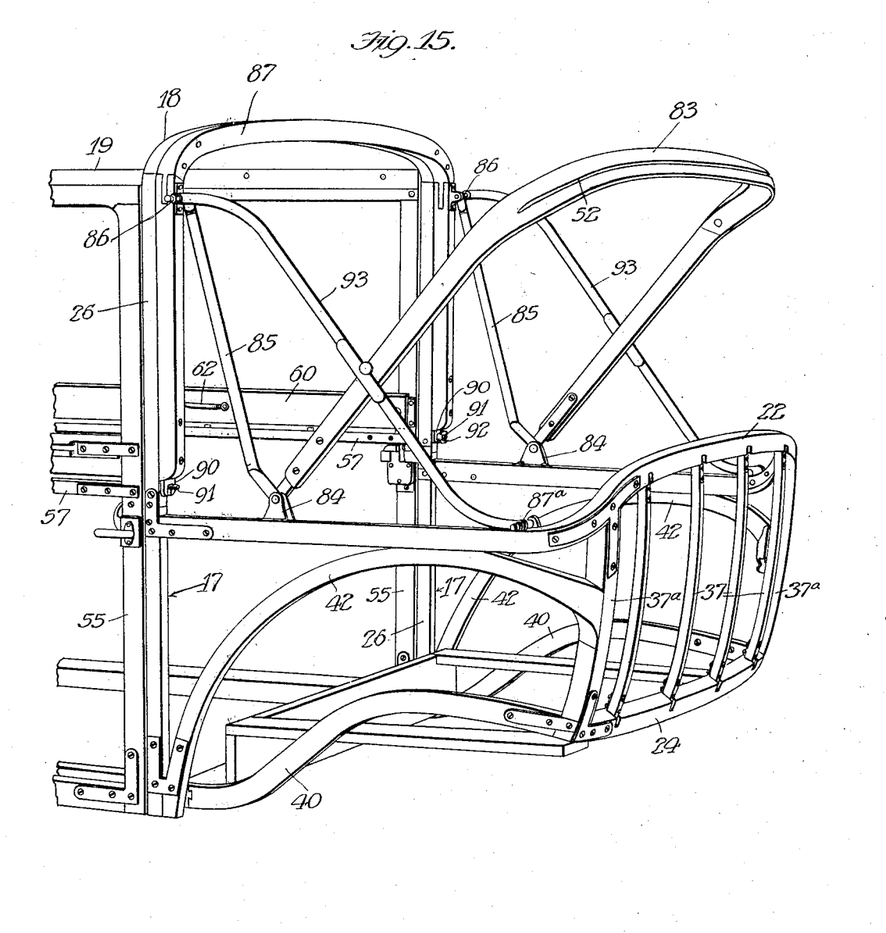

The modified form of body shown in Figs. 14 and 15 is quite similar to that shown in Fig. 1, except for the style of body. Figs. 14 and 15 show a so-called two-door body, having a collapsible rear top portion. It is not thought necessary to describe the specific parts of the skeleton frame and doors as their construction will be evident from Figs. 14 and 15 in view of the foregoing description, particularly as like reference numerals have been applied to the parts corresponding to those of the body shown in Fig. 1. Referring to the collapsible rear top portion, it will be observed that the main bow 83 is pivoted at its ends to brackets 84 secured to the horizontal rear bow 22 of the rear end or tonneau structure. Links 85 are connected at their lower ends (considering Fig. 15) to the same pivots and at their upper ends to pivot devices 86 secured to a movable bow 87. Toggle links 93 are connected at their upper forward ends to the pivots 86 and at their rear ends to pivots 87ª, fixed on the horizontal frame unit 22. It will be understood, of course, that over the bows 83 and 87, is stretched the usual flexible covering which is secured at its lower edge all around the horizontal frame unit 22. When the rear top portion is down or collapsed, the parts are in the position illustrated in Fig. 14. When it is to be extended, the bow 87 is moved to the position shown in Fig. 15, and the toggle links 93 straighten out and aid in keeping the bow 87 in such a position flat against the rear transverse frame 18. The lower ends of the bow 87 are provided with plates 90 having recesses adapted to fit over bolts 91 projecting rearwardly from the transverse frame 18. When the rear top portion is extended, the lower ends of the bow 87 are held firmly in place by wing nuts 92, mounted on the threaded bolts 91. In Fig. 15 the left hand wing nut 92 is removed to show the recess in the plate 90.

While I have shown various features of my invention applied to but two styles of bodies, it will be evident that they are adapted for use in other styles of bodies and that various modifications may be made in the same without departing from the scope or spirit of my invention as defined in the following claims.

I claim:

1. In a road motor vehicle body, adapted to weave with the chassis frame, a forward skeleton comprising transverse vertical frames and means for flexibly connecting said frames together, a tonneau structure comprising a frame of flexibly connected pieces with an upper horizontal U-shaped frame unit, means for flexibly connecting said tonneau structure to said forward skeleton, and a flexible covering around said skeleton frame and tonneau structure, and additional means supported by said upper frame unit for giving shape and support to said covering to shape the rear upper end of said body.

2. In a road motor vehicle body, adapted to weave with the chassis frame, a forward skeleton comprising transverse vertical frames, spacing pieces between said frames and flexible joints connecting said spacing pieces and frames, a tonneau structure comprising a skeleton of flexibly connected pieces with a horizontal U-shaped frame unit uppermost and connected to a mid-part of the rearmost of said transverse vertical frames, flexible joints for connecting said tonneau structure to the rearmost of said transverse vertical frames, and a flexible covering around the forward skeleton and tonneau structure.

3. In a road motor vehicle body, adapted to weave with the chassis frame, a forward skeleton comprising transverse vertical frames and means for flexibly connecting said frames together, a tonneau structure comprising a skeleton of flexibly connected pieces with an upper horizontal U-shaped frame unit, means for flexibly connecting said tonneau structure to said forward skeleton, a flexible covering around said forward skeleton and tonneau structure, and inclined pieces connecting said upper horizontal frame unit to the upper portion of the rear vertical transverse frame.

4. In a road motor vehicle body, adapted to weave with the chassis frame, a forward skeleton comprising transverse vertical frames and means for flexibly connecting said frames together, a tonneau structure comprising a skeleton of flexibly connected pieces with an upper, horizontal U-shaped frame unit, means for flexibly connecting said tonneau structure to said forward skeleton, a flexible covering around said skeleton frame and tonneau structure, inclined pieces connecting said upper horizontal frame unit to the upper portion of the rear transverse vertical frame, and an inclined rear top bow carried by said inclined pieces.

5. In a road motor vehicle body, adapted to weave with the chassis frame, a forward skeleton comprising transverse vertical frames and means for flexibly connecting said frames together, a tonneau structure comprising a skeleton of flexibly connected pieces with an upper, horizontal U-shaped frame unit, means for flexibly connecting said tonneau structure to said forward skeleton, a flexible covering around said forward skeleton and tonneau structure, and an inclined bar at each side, the ends of the bar being connected flexibly to the rear transverse vertical frame and said upper horizontal U-shaped frame.

6. In a road motor vehicle body, adapted to weave with the chassis frame, a forward skeleton comprising transverse vertical frames and means for flexibly connecting said frames together, a tonneau structure comprising a skeleton of flexibly connected pieces with an upper, horizontal U-shaped frame unit, means for flexibly connecting said tonneau structure to said forward skeleton, a flexible covering around said forward skeleton and tonneau structure, and an inclined channeled-shaped bar at each side connected to the rear transverse vertical frame and horizontal frame unit, and a rear top bow having its ends seated in the channels of said inclined bars.

7. In a road motor vehicle body, adapted to weave with the chassis frame, a forward skeleton comprising transverse vertical frames and means for flexibly connecting said frames together, a tonneau structure comprising a skeleton of flexibly connected pieces with an upper, horizontal frame unit, means for flexibly connecting said tonneau structure to said forward skeleton, a flexible covering around said forward skeleton and tonneau structure, inclined pieces connecting said upper horizontal frame unit to the upper portion of the rear transverse vertical frame, an inclined rear top bow carried by said inclined pieces and a window frame flexibly connected to said inclined rear top bow and said upper horizontal frame unit.

8. In a road motor vehicle body adapted to weave with the chassis frame, the combination of transverse vertical frames, each comprising vertical posts and a top bow, means for connecting the tops of the posts and ends of the bows together, said means comprising flat strips of metal with bolts extending through holes in the strips and bows, longitudinal spacing pieces between the upper ends of the frames, and brackets formed of strips of metal provided with lateral projections for connection to the longitudinal spacing pieces, said last mentioned brackets being superimposed upon portions of said first-mentioned strips and being held in place thereon by certain of said bolts.

9. A road motor vehicle body comprising a skeleton frame formed of longitudinal and vertical pieces some of which are spaced to provide a door opening, said pieces being covered with a flexible covering and adapted to weave or flex with the chassis frame, a flexible door mounted in said opening so as to weave or flex with the skeleton, an instrument supporting panel, and means for pivotally mounting said panel on said door so as not to interfere with the flexing of the latter.

10. In a road motor vehicle body, adapted to flex with the chassis frame, the combination of a flexible frame, having a door opening, the door positioned in said opening and adapted to flex with said skeleton, hinges secured to one side of the door, a lock pivoting the other or free side of the door, and means on the frame and contacting with the free side of the door to cause the latter side of the door to flex laterally in unison with the lateral flexing of the body.

11. In a road motor vehicle body, adapted to flex with the chassis frame and comprising a fabric-covered flexible skeleton, and a partition unit within the body to divide the latter into compartments and comprising a frame formed of pieces and flexible joints for connecting the pieces together and to the skeleton so that the partition is adapted to flex and does not interfere with the weaving action of the skeleton.

12. In a road motor vehicle body adapted to flex with the chassis frame and comprising a fabric-covered skeleton formed of a plurality of flexible transverse vertical frames connected together, a partition unit for dividing the body into compartments and comprising vertical posts, pieces connecting the posts together, and converging sides, and means for flexibly connecting the parts of the partition together and for flexibly connecting the partition to one of the transverse vertical frames.

13. In a road motor vehicle body, adapted to weave with the chassis frame, a forward skeleton, comprising transverse vertical frames and separate means for connecting said transverse vertical frames to each other and to said chassis frame to permit said frames to move relative to each other, a tonneau skeleton structure comprising substantially parallel horizontal superimposed frames the upper of which extends rearwardly from a mid part of the adjacent of said transverse vertical frames, means for flexibly connecting said horizontal frames together, means for flexibly connecting said tonneau structure to said adjacent transverse vertical frame, a flexible covering for the forward skeleton and tonneau skeleton structure, such tonneau including another and separate member for supporting and giving shape to said covering to give shape to the rear upper end of said body.

14. A road motor vehicle body, adapted to flex or weave with the chassis frame, comprising a plurality of frame units one at least of which is adapted to flex or distort within itself according to the body flexing and weaving, an instrument supporting panel, and means for pivotally supporting the panel on said frame unit so that the panel does not interfere with the flexing of the one frame unit or the body as a whole.

15. A road motor vehicle body, adapted to weave with the chassis frame, comprising a plurality of frame units one of which is of rectangular shape adapted to flex or distort within itself, an instrument supporting panel, metal plates on the side pieces of said one frame unit, and pivot means for pivotally mounting said panel on said plates so that said panel does not interfere with the flexing of said one frame unit in the body as a whole.

16. A road motor vehicle body adapted to flex with the chassis frame, comprising a skeleton covered with a flexible covering and including a plurality of frame units, one of said frame units comprising a flexible frame adapted to flex with the other frame units, said one frame unit being adapted to support a window, a panel adapted to support window operating means, and means for pivotally mounting said panel on the inside of said one frame unit so that the panel does not interfere with the flexing of said one frame unit and the body as a whole.

17. In a road motor vehicle body, adapted to flex with a chassis frame, the combination of a flexible skeleton consisting of a plurality of frame units some of which are adapted for swinging movement relative to others for entry to and exit from the body, said swinging frame units being adapted to flex and weave with the skeleton, and a metal strip secured to the free edge of the swinging frame to maintain the shape of that edge and its alignment with the adjacent frame unit.

18. In a road motor vehicle body, adapted to flex with the chassis frame, the combination of a flexible skeleton adapted to flex with the chassis frame and formed of a plurality of frame units which are adapted to form a door opening, a door secured by hinges to one of said frame units, a lock means between the other of said frame units and the door for permitting a flexing movement between said door and frame units, and a thin annealed steel strip secured to the free edge of said frame, at the opening, to hold it in proper alignment.

In testimony whereof, I have subscribed my name.

CHARLES TERRES WEYMANN.